United States Patent [19]

Vachon

[11] 4,119,680
[45] Oct. 10, 1978

[54] COPOLYESTERS AS IMPROVED BINDERS AND FINISHES FOR POLYESTER-CONTAINING FABRICS

[75] Inventor: Raymond N. Vachon, Kingsport, Tenn.

[73] Assignee: Eastman Kodak Company, Rochester, N.Y.

[21] Appl. No.: 716,920

[22] Filed: Aug. 23, 1976

[51] Int. Cl.$^2$ .............................................. C08L 61/20
[52] U.S. Cl. ................................... 260/850; 66/169 R; 260/29.6 NR; 260/29.6 SQ; 528/295
[58] Field of Search ............... 260/29.6 NR, 29.4 UA, 260/75 S, 29.6 SQ, 850

[56] References Cited

U.S. PATENT DOCUMENTS

| | | | |
|---|---|---|---|
| 3,551,479 | 12/1970 | Emmons | 260/29.6 SQ |
| 3,577,478 | 5/1971 | Thorpe | 260/29.6 NR |
| 3,681,108 | 8/1972 | Lewis et al. | 260/29.6 NR |
| 3,734,874 | 5/1973 | Kibler et al. | 260/75 S |
| 3,853,820 | 12/1974 | Vachon | 260/75 S |
| 3,975,566 | 8/1976 | Holdo et al. | 260/850 |
| 3,979,478 | 9/1976 | Gallacher | 260/850 |
| 3,996,181 | 12/1976 | Hayashi et al. | 260/29.6 RW |

Primary Examiner—Melvyn I. Marquis
Attorney, Agent, or Firm—J. Frederick Thomsen; Daniel B. Reece, III

[57] ABSTRACT

A process for the production of stable aqueous polymer dispersions which comprises polymerizing about 10–80 percent by weight based on the total amount of non-aqueous matter of olefinically unsaturated monomers under free radical emulsion polymerization conditions in the presence of about 90–20 percent by weight based on the total amount of non-aqueous matter of water-dispersible polyester derived essentially from components (1), (2), (3) and (4) as follows:

(1) at least one dicarboxylic acid;

(2) at least one diol, at least 20 mole percent of said diol component being a poly(ethylene glycol) having the formula

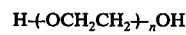

$$H{+}OCH_2CH_2{+}_n OH$$

wherein $n$ is an integer of from 2 to about 10, (3) at least one difunctional dicarboxylic acid sulfomonomer containing a —SO$_3$M group attached to an aromatic nucleus, wherein M is hydrogen or Na$^+$, Li$^+$, K$^+$ or a combination thereof, said sulfomonomer component constituting at least about 8 mole percent to about 45 mole percent of the sum of the moles of said Components 1, 3 and 4, and (4) from about 4 to about 8 mole percent of the sum of the moles of said Components 1, 3 and 4 of an α,β-unsaturated dicarboxylic acid selected from the group consisting of fumaric acid, maleic acid, itaconic acid and p-carboxycinnamic acid; said polymer having an inherent viscosity in the range of from about 0.15 to about 0.5 as measured at 25° C. and a concentration of about 0.5 gram of said polyester per 100 ml. of a solvent composed of 60% phenol and 40% tetrachloroethane.

2 Claims, No Drawings

COPOLYESTERS AS IMPROVED BINDERS AND FINISHES FOR POLYESTER-CONTAINING FABRICS

This invention relates to compositions useful as binders and finishes for textile articles. More specifically, this invention relates to compositions useful as binders and finishing agents for textile articles containing polyester fibers. The compositions of this invention are useful fo imparting strength and durability to nonwoven polyester fabrics, as well as modifying the hand and reducing the tendency of knitted and woven fabrics constructed from texturized polyester yarns to snag or pick on sharp or abrasive objects during wear. Additionally, this invention relates to a process for making stable aqueous dispersions of these conditions.

Broadly, this invention discloses compositions prepared by the polymerization of vinyl or acrylic monomers in the presence of water-dispersible copolyesters of aromatic sodiosulfo monomers which contain an $\alpha,\beta$-unsaturated dicarboxylic acid. It has been discovered that the unsaturated dicarboxylic acid in the water-dispersible copolyesters is necessary to obtain the properties and durability of the compositions described in this invention.

Accordingly, there is provided a process for the production of stable aqueous polymer dispersion which comprises polymerizing about 10–80 percent by weight based on the total amount of non-aqueous matter of olefinically unsaturated monomers under free radical emulsion polymerization conditions in the presence of about 90–20 (preferably 70 to 40%) percent by weight based on the total amount of non-aqueous matter of a water-dispersible polyester dervied essentially from components (1), (2), (3) and (4) as follows:

(1) at least one dicarboxylic acid;
(2) at least on diol, at least 20 mole percent of said diol component being a poly(ethylene glycol) having the formula

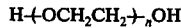

wherein $n$ is an integer of from 2 to about 10,
(3) at least one difunctional dicarboxylic acid sulfomonomer containing a —$SO_3M$ group attached to an aromatic nucleus, wherein M is hydrogen or $Na^+$, $Li^+$, $K^+$ or a combination thereof, said sulfo-monomer component constituting at least about 8 mole percent to about 45 mole percent of the sum of the moles of said Components 1, 3 and 4, and
(4) from about 4 to about 8 mole percent of the sum of the moles of said Components 1, 3 and 4 of an $\alpha,\beta$-unsaturated dicarboxylic acid selected from the group consisting of fumaric acid, maleic acid, itaconic acid and p-carboxycinnamic acid; said polymer having an inherent viscosity in the range of from about 0.15 to about 0.5 as measured at 25° C. and a concentration of about 0.5 gram of said polyester per 100 ml. of a solvent composed of 60% phenol and 40% tetrachloroethane.

The properties of the polymers thus prepared can be varied within wide limits to the particular purpose for which they are to be used by a judicious selection of starting materials. Thus, soluble polymers can be obtained by polymerizing vinyl monomers which have no crosslinking effect in an aqueous dispersion of an uncrosslinked anionic polyester. The hydrophilic and hydrophobic properties, hardness and flexibility, or elasticity of the resulting polymers can be varied by selecting suitable monomers and the anionic polyesters.

The dicarboxylic acid component from which the linear water-dissipatable polyester is prepared can be any aliphatic, cycloaliphatic, or aromatic acid. Examples of such dicarboxylic acids include oxalic, malonic, dimethyl malonic, succinic, glutaric, adipic, trimethyl adipic, pimelic, 2,2-dimethylglutaric, azelaic, sebacic, 1,3-cyclopentane dicarboxylic acid, terephthalic acid, isophthalic acid, and the like. If terephthalic acid is used as the dicarboxylic acid component of the polyester, especially good results are achieved when at least 5 mole percent of one or the other acids listed above is used.

It should be understood that the use of the corresponding anhydrides, esters, and chlorides of these acids is included in the term "dicarboxylic acid". The esters are preferred examples of which include dimethyl 1,4-cyclohexanedicarboxylate; dimethyl 2,6-naphthalenedicarboxylate; dimethyl isophthalate; dimethyl terephthalate; and diphenyl terephthalate. Copolyesters may be prepared from two or more of the above dicarboxylic acids or derivatives thereof.

At least about 20 mole percent of the diol component used in preparing the polyester sizing composition is a poly(ethylene glycol) having the formula

wherein $n$ is an integer from 2 to about 10. Examples of suitable poly(ethylene glycols) include diethylene, triethylene, tetraethylene, pentaethylene, hexaethylene, heptaethylene, octaethylene, nonaethyene, and decaethylene glycols, and mixtures thereof. Preferably, the poly(ethylene glycol) employed is diethylene glycol, triethylene glycol, or mixtures thereof. Especially preferred is diethylene glycol. The remaining portion of the diol component may be at least one aliphatic, cycloaliphatic or aromatic diol. Examples of these diols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; 1,2-cyclohexanedimethanol; 2,2,4,4-tetramethyl-1,3-cyclobutanediol; and p-xylylenediol. Copolymers may be prepared from two or more of the above diols.

A third component used to prepare the polyester sizing composition is a difunctional monomer containing a —$SO_3M$ group attached to an aromatic nucleus, wherein M is hydrogen or a metal ion. This difunctional monomer component may be either a dicarboxylic acid (or derivative thereof) containing a —$SO_3M$ group or a diol containing a —$SO_3M$ group. The metal ion of the sulfonate salt group may be $Na^+$, $Li^+$ or $K^+$. It is possible to prepare the polyester using, for example, a sodium sulfonate salt and later by ion-exchange replace this ion with a different ion (for example, calcium) and thus alter the characteristics of the polyester.

The —$SO_3M$ group is attached to an aromatic nucleus, examples of which include benzene, naphthalene, anthracene, diphenyl, oxydiphenyl, sulfonyldiphenyl, and methylenediphenyl.

Especially good results are obtained when the difunctional monomer is the sodium salt of a sulfoisophthalic, sulfoterephthalic, sulfophthalic, or 4-sulfonaphthalene-2,7-dicarboxylic acid (or derivatives of such acids). A highly preferred such monomer is 5-sodiosulfoisophthalic acid or a derivative thereof such as 5-sodiosulfodimethyl isophthalate. Another preferred difunctional monomer is 5-sulfoisophthalic acid. Monomers containing a —SO₃M group are described in Kibler et al. U.S. Ser. No. 695,339, filed Jan. 3, 1968, now abandoned in favor of a continuation-in-part.

Other effective difunctional monomers containing a —SO₃M group attached to an aromatic nucleus include metal salts of aromatic sulfonic acids (or esters thereof). These monomers have the general formula

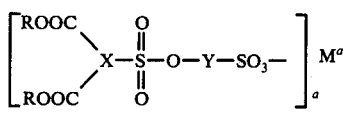

wherein X is a trivalent aromatic hydrocarbon radical, Y is a divalent aromatic hydrocarbon radical, R is hydrogen or an alkyl group of one to four carbon atoms, M is hydrogen, Na⁺, Li⁺ or K⁺, and $a$ is 1, 2, or 3. These monomers are described, including methods for their preparation, in Lappin et al. U.S. Ser. No. 695,349, filed Jan. 3, 1968, now U.S. Pat. No. 3,528,947, patented on Sept. 15, 1970. Examples of preferred monomers here are 4-sodiosulfophenyl-3,5-dicarbomethoxybenzenesulfonate, 4-lithiosulfophenyl-3,5-dicarbomethoxybenzenesulfonate; and 6-sodiosulfo-2-naphthyl-3,5-dicarbomethoxybenzenesulfonate.

Other effective difunctional monomers containing a —SO₃M group attached to an aromatic nucleus include metal salts of sulfodiphenyl ether dicarboxylic acids (or esters thereof). These monomers have the general formula

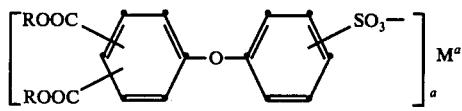

wherein R is hydrogen, an alkyl group of one to eight carbon atoms, or phenyl, and M is hydrogen, Na⁺, K⁺ or Li⁺, and $a$ is 1, 2, or 3. These monomers are described, including methods for their preparation, in Lappin et al. U.S. Ser. No. 671,565, filed Sept. 29, 1967, now abandoned and substituted by streamlined continuation Ser. No. 835,295 which was published Nov. 18, 1969, as a Defensive Publication, 868 O.G. 730. Examples of preferred monomers here are dimethyl 5-[4-(sodiosulfo)phenoxy]isophthalate, dimethyl 5-[4-(sodiosulfo)phenoxy]terephthalate, and 5-[4-(sodiosulfo)phenoxy]isophthalic acid.

The α,β-unsaturated dicarboxylic acid, further identified as component 4, is selected from the group consisting of fumaric acid, maleic acid, itaconic acid, and p-carboxycinnamic acid.

The only limitation to the combinations of acids ad diols that can be used in accordance with this invention is that the resultant polymers must be water-dispersible, either alone or in combination with emulsifiers.

The I.V. of the starting water-dispersible polyesters, i.e., before grafting, that can be used to prepare the graft copolymers of this invention range from 0.15 to 0.50. The preferred copolyesters have inherent viscosity values from around 0.2 to about 0.25, as measured at 25° C. using 0.50 gram of polymer per 100 ml. of a solvent composed of 60 percent phenol and 40 percent tetrachloroethane.

In principle, any radically polymerizable olefinically unsaturated compounds and mixtures thereof may be used as the monomers in the practice of this invention, including any of those listed in U.S. Pat. No. 3,225,119. Some examples of suitable compounds include:

1. Ester of α,β-unsaturated carboxylic acids such as, for example, methyl methacrylate, ethyl acrylate, butyl acrylate, stearyl methacrylate, hydroxypropyl acrylate, 2-aminoethyl methacrylate hydrochloride, dimethylaminoethyl methacrylate, methoxymethyl methacrylate, chloromethyl methacrylate, dichlorotriazinylaminoethyl methacrylate, esters of maleic acid, fumaric acid or itaconic acid and the like;

2. α,β-unsaturated carboxylic acids such as, for example, acrylic acid, methacrylic acid, maleic acid and the like;

3. Amides of α,β-unsaturated carboxylic acids such as, for example, acrylamide, methacrylamide, maleic acid amide, maleic acid imide and the like;

4. Substituted amides of unsaturated carboxylic acids such as, for example, methylol methacrylamide, methoxymethyl acrylamide, N-(methylacrylamidomethyl)-urethane, N-(chloroacrylamidomethyl)-acrylamide and the like;

5. Nitriles of α,β-unsaturated carboxylic acids such as, for example, acrylonitrile, methacrylonitrile and the like;

6. Vinyl esters such as, for example, vinyl acetate, vinyl chloroacetate, vinyl chloride and the like;

7. Vinyl ethers such as, for example, vinyl ethyl ether and the like;

8. Vinyl ketones such as, for example, vinyl methyl ketone and the like;

9. Vinyl amides such as, for example, vinyl formamide, vinyl acetamide and the like;

10. Aromatic vinyl compounds such as, for example, styrene, vinyl toluene and the like;

11. Heterocyclic vinyl compounds such as, for example, vinyl pyridine, vinyl pyrrolidone and the like;

12. Vinylidene compounds such as, for example, vinylidene chloride and the like;

13. Divinyl compounds such as, for example, divinyl benzene, butanediol dimethacrylate and the like;

14. Monoolefins such as, for example, ethylene, propylene and the like;

15. Conjugated diolefins such as, for example, butadiene, isoprene, 2-chlorobutadiene and the like;

16. Allyl compounds such as, for example, allyl acetate, allyl alcohol and the like.

Any suitable polymerization catalysts may be used including inorganic peroxidic compounds such as potassium or ammonium persulphate, hydrogen peroxide or percarbonates; organic peroxidic compounds, such as acyl peroxides including, for example, benzoyl peroxide, alkyl hydroperoxides, such as tert-butyl hydroperoxide, cumene hydroperoxide and p-menthane hydroperoxide; dialkyl peroxides such as di-tert-butyl peroxide; peroxy esters such as tert-butyl perbenzoate and the like and mixtures thereof. The inorganic peroxidic compounds are advantageously used in combination with any suitable reducing agents known per se including sodium pyrosulphite or bisulphite, sodium formaldehyde sulphoxylate, triethanolamine, tetraethylene pentamine and the like. Also azo compounds such as azoisobutyronitril, azoisobutyric acid ethylester, azoisobutyroamidine, 4,4′-azo-4-cyano-valerianic acid and the like are particularly suitable. The initiators which decompose into radicals may be used alone or in combination with reducing agents or heavy metal compounds. Sodium pyrosulphite, potassium pyrosulphite, formic acid, ascorbic acid, hydrazine derivatives, amine derivatives are rongalite and examples of reducing agents. The heavy metal compounds may be present either in an oil soluble or in a water soluble form. Water soluble heavy metal compounds include for example, silver nitrate, halides or sulphates of divalent or trivalent iron, cobalt or nickel, or salts of titanium or vanadium of lower valences state. Examples of oil soluble heavy metal compounds are cobaltnaphthenate and the acetyl acetone complexes of vanadium, cobalt, titanium, nickel or iron. Preferred initiator systems are combinations of oxidizing agents with reducing agents such as combinations of above peroxides or inorganic oxidizing agents such as metal chlorates, metal chlorides or metal hypychlorites with reducing agents such as hydrazine, hydroxyl amine and especially compounds of the divalent or tetravalent sulfur such as metal sulphites, metal sulphides, metal thiosulphates and especially sulphinates such as sodium hydroxymethyl sulphinate.

The catalysts are employed in the catalytic quantities normally used to initiate polymerization reactions of this kind, i.e., in quantities of from about 0.01 to about 5 percent by weight, preferably 0.02 to 1 percent by weight, based on the total weight of the monomer.

Preferred for the graft copolymerization of the polyesters identified as component A are the acrylate monomers having the general formula

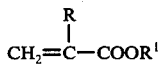

wherein R is hydrogen, methyl or ethyl; and $R^1$ is an alkyl group containing 1 to 8 carbon atoms. Examples of the monomers of the foregoing type include methyl acrylate, ethyl acrylate, the propyl acrylates, the butyl acrylates, 2-methylhexyl acrylate, 2-ethylhexyl acrylate, n-octyl acrylate, methyl methacrylate, ethyl methacrylate, octyl methacrylate and the like.

In order to obtain durability to laundering and dry cleaning in the final product, it is necessary to crosslink the polymers. This requires that reactive monomers be incorporated into the copolymers at levels usually less than 10%. Examples of such monomers are the N-alkylol amides of an $\alpha,\beta$-monoolefinically unsaturated carboxylic acid such as N-methylol acrylamide, N-methylol methacrylamide, and the like, which can be self-crosslinked in the presence of an acid catalyst or crosslinked with melamine and epoxy resins, among others; oxirane (epoxy) containing monomers such as glycidyl methacrylate, glycidyl acrylate, and the like, which can be crosslinked with phenolic or aminoplast resins among others; oxirane (epoxy) containing monomers such as glycidyl methacrylate, glycidyl acrylate, and the like, which can be crosslinked with phenolic or aminoplast resins among others; carboxyl-containing monomers, such as described above, crosslinked with epoxy resins, phenolic resins, aminoplast resins, and urea or triazine-formaldehyde resins; hydroxyl-containing monomers, such as described above, are cured under acid conditions with melamine-formaldehyde resins, phenolic resin, epoxy resins, etc., or internally crosslinked when copolymerized with acid monomers or oxirane-containing monomers. These reactive monomers enhance the physical properties and the durability to laundering and dry cleaning of the cured polymer films.

Therefore, the preferred compositions prepared by the novel process of this invention are those comprising a graft copolymer of components A, B, C, and D as follows:

A. a water-dispersible polyester derived essentially from
(1) at least one dicarboxylic acid;
(2) at least one diol, at least 20 mole percent of said diol component being a poly(ethylene glycol) having the formula

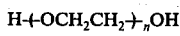

wherein $n$ is an integer of from 2 to about 10,
(3) at least one difunctional dicarboxylic acid sulfomonomer containing a $-SO_3M$ group attached to an aromatic nucleus, wherein M is hydrogen or $Na^+$, $Li^+$, $K^+$ or a combination thereof, said sulfo-monomer component constituting at least about 8 mole percent to about 45 mole percent of the sum of the moles of said Components 1, 3 and 4, and
(4) from about 4 to about 8 mole percent of the sum of the moles of said Components 1, 3 and 4 of an $\alpha,\beta$-unsaturated dicarboxylic acid selected from the group consisting of fumaric acid, maleic acid, itaconic acid and p-carboxycinnamic acid; said polymer having an inherent viscosity in the range of from about 0.15 to about 0.5 as measured at 25° C. and a concentration of about 0.5 gram of said polyester per 100 ml. of a solvent composed of 60% phenol and 40% tetrachloroethane;

B. from 10 to 80 weight percent, based on the total weight of Components A, B and C, of an acrylic monomer having the formula

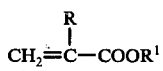

wherein R is hydrogen, methyl or ethyl and $R^1$ is an alkyl radical having from 1 to about 8 carbon atoms, vinyl acetate or styrene;

C. from 2 to 10 weight percent based on the weight of Components A, B and C of a reactive monomer selected from acrylamide and methacrylamide, hydroxyethyl acrylate, hydroxypropyl acrylate, hydroxyethyl methacrylate, and hydroxypropyl methacrylate; and D. from 1 to 10 weight percent, based on the weight of Components A, B and C of a crosslinking agent selected from melamine-formaldehyde condensates, methylated melamine-formaldehyde condensates, urea-formaldehyde condensates, methylated urea-formaldehyde condensates, guanamine-formaldehyde condensates and methylated guanamine-formaldehyde condensates.

To obtain the grafted copolymers of this invention, conventional polymerization techniques may be employed. In general, the polymerization is carried out at temperatures of about 20° to 60° C. (preferably 20°–40° C.), in the presence of free radical initiators. Free radical initiators which are useful include various peroxygen compounds such as the persulfates, benzoyl peroxide, t-butyl hydroperoxide, cumene hydroperoxide; azo compounds such as azodiisobutyronitrile and the like. Especially useful polymerization initiators are the water-soluble peroxygen compounds such as hydrogen peroxide and the sodium, potassium and ammonium persulfates. These water-soluble peroxygen compounds may be used by themselves or in an activated redox system. Typical redox systems include alkali metal persulfates with a reducing substance such as sodium sulfite or sodium bisulfite and the like. Heavy metal ions may be used to activate the persulfate catalyzed polymerization. Ferrous sulfate has been found to be an excellent initiator for the low temperature polymerization. The amount of initiator used will generally range between 0.1 to 3% based on the weight of monomers and unsaturated polymers and preferably between about 0.5 to 1.0% by weight. The initiators will generally be charged at the outset of the polymerization, however, incremental addition can be employed if desired.

In general, the water-dispersible copolyesters are excellent emulsifiers for the monomers. However, at high concentrations of water-insoluble monomers, additional emulsifiers can be used for added stability. Typical anionic emulsifiers which may be employed are the alkali or ammonium salts of the sulfates of an alcohol containing from 8 to 18 carbon atoms such as sodium lauryl sulfate; ethanolamine lauryl sulfate; ethyl amine lauryl sulfate; alkali metal or ammonium salts of sulfonated petroleum or paraffin oils; sodium salts of aromatic sulfonic acids such as dodecane-1-sulfonic acid and octadiene-1-sulfonic acid; aralkene sulfonates such as sodium isobutylbenzene sulfonate; alkali metal and ammonium salts of sulfonated dicarboxylic acid esters such as sodium dioctyl sulfosuccinate; alkali metal or ammonium salts of the free acids of complex organic mono- and diphosphate esters; and the like. When nonionic emulsifiers are used, they may be of the general type such as octyl or nonylphenol poly(ethoxy ethanol) and the like. Cationic emulsifiers are not used since they may precipitate the copolyesters which contain anionic groups. If an emulsifier is used, the amount will range from about 0.01 to 6% or more by weight of the monomers.

The compositions of this invention are applied to nonwoven fabrics by conventional application techniques such as padding, printing and spraying. The treated fabrics are dried on pin frames at room temperature, then cured in forced air ovens.

Nonwoven fabrics were evaluated for tensile properties using the grab method (ASTM Test Method D1682-64).

Knit fabrics made from textured polyester filaments were evaluated for snagging tendency using the ICI Mace Tester and comparing the snagged samples to photographic standards. The snagged fabrics are rated on a scale of 1-5 with the lower numbers indicating samples that snag badly.

The following examples are included for a better understanding of the invention.

EXAMPLE 1

A mixture of 200.2 g. (1.032 moles) of dimethylisophthalate, 35.52 g. (0.12 mole) of dimethyl 5-sodiosulfoisophthalate, 10.95 g. (0.048 mole) of dibutyl fumarate, 254.4 g. (2.40 moles) of diethylene glycol, and 0.0374 g. of titanium isopropoxide is purged with $N_2$ and evacuated (0.5 mm.) while being stirred. The vacuum is released to nitrogen and the flask heated at 175° C. Methanol is distilled off and after 20 min. at 175° C., the bath temperature is raised to 245° C. over a period of 3½ hr. The melt is held at 245° C. for 25 min., then a vacuum is applied and held for 18 min. A low to medium melt viscosity, clear amber polymer of I.V. = 0.22 is obtained.

The solid polymer is broken into small pieces and added to water at room temperature. The polymer disperses readily to form a slightly opaque dispersion of 30% solids.

EXAMPLE 2

To a 100 ml., 3-necked flask fitted with a magnetic stirrer and a condenser is added 24.5 g. of a 30% dispersion of the copolyester described in Example 1, 7.5 g. of 1% $K_2S_2O_8$, 1.00 g. of 1% $Na_4P_2O_7$, 0.3 g. acrylamide, 7.35 g. of ethyl acrylate and 5.35 g. of distilled water. The charge is flushed 10 min. with nitrogen, then 3.75 g. of 1% $Na_2S_2O_5$ and 0.5 g. of 0.1% $FeSO_4$ are added. The flask is at room temperature at the start of the reaction, i.e., 72° F. After addition of the reducing agents an exotherm occurs. Stirring is continued until the flask again returns to room temperature then 3.0 g. of 1% $Na_2S_2O_5$ is added. A stable, milky white dispersion is formed at 30% total solids.

EXAMPLES 3-12

Following the procedure of Example 2, a series of copolymers was prepared which contained 20-90% ethyl or butyl acrylate on the weight of solids. In order to obtain films that have good wet strength, 2% Cymel 300 (ows = on weight of solids), hexamethoxymethyl melamine, obtained from American Cyanamid Co., and 0.2% citric acid (ows) are added to the dispersions. Films of the dispersion are cast on glass plates, air dried and cured 10 min. at 165° C. Film properties of the copolymers are given in Table 1.

EXAMPLES 13-14

To show the importance of the double bond in the water-dispersible copolyester, ethyl acrylate was polymerized in the presence of a copolyester containing 90 mole % isophthalic acid, 10 mole % 5-sodiosulfoisophthalic acid and diethylene glycol. The properties of cast films are shown in Table 1. It is seen that compared to Examples 9 and 7, films of Examples 13 and 14 have considerably greater weight loss in hot water which results in lower wet strength of the copolymers.

EXAMPLES 15-18

The usefulness of the copolyesters as binders for polyester-containing nonwoven fabrics is shown by the results in Table 2. Dispersions of the copolyesters are applied to an experimental 100% polyester nonwoven fabric, 0.8 oz./yd.$^2$, by padding. Cymel 300, hexamethoxymethyl melamine (2% ows), and citric acid (0.2% ows) are added to the pad baths. The treated samples are dried on pin frames under ambient conditions and cured 90 sec. at 170° C. The breaking strengths of the fabrics are obtained before and after five home launderings.

EXAMPLE 19

The usefulness of compositions of this invention as antisnag finishes for knits made from textured polyester yarns is shown in Table 3. A ponte di Roma double knit yarns weighing 7.45 oz./yd.$^2$ and having a count of 31 wales × 64 courses is treated with the compositions shown in Table 3. The dispersions contain 2% Cymel 300 (ows) and 0.2% citric acid (ows). The finishes are applied by padding. The fabrics are dried on pin frames under ambient conditions and cured in a forced air oven for 90 sec. at 170° C. The results in Table 3 show a significant reduction in the snagging tendency of the treated knitted fabrics.

TABLE 1
Properties of Ethyl and Butyl Acrylate Grafted Copolyesters

| Example | Composition | Modulus (psi) | Strength to Break (psi) | Elongation to Break (%) | Flexibility of Films | Adhesion to Poly(ethylene terephthalate) Film | Weight Loss of Films in Water at 160° F. % |
|---|---|---|---|---|---|---|---|
| 3 | 89/9/2 P/EA/AM$^a$ | 31,785 | 2363 | 245 | Stiff | Good | 10.2 |
| 4 | 79/19/2 P/EA/AM | 26,901 | 1741 | 280 | Stiff | Good | 11.6 |
| 5 | 69/29/2 P/EA/AM | 17,727 | 1900 | 360 | Flexible | Good | 4.1 |
| 6 | 59/29/2 P/EA/AM | — | 1015 | 308 | Flexible | Good | 4.3 |
| 7 | 49/49/2 P/EA/AM | 10,454 | 1467 | 339 | Flexible | Good | 6.0 |
| 8 | 39/59/2 P/EA/AM | 8,216 | 1245 | 269 | Flexible | Fair | 2.3 |
| 9 | 29/69/2 P/EA/AM | 2,065 | 987 | 318 | Flexible | Fair | 4.2 |
| 10 | 19/79/2 P/EA/AM | 2,222 | 785 | 324 | Flexible | Fair | 3.5 |
| 11 | 39/59/2 P/BA/AM | 4,777 | 980 | 308 | Flexible | Fair | — |
| 12 | 59/39/2 P/BA/AM | 14,506 | 1524 | 338 | Flexible | Good | 12.1 |
| 13 | 29/69/2 Q/EA/AM | 4,667 | 1133 | 347 | Flexible | Good | 18.2 |
| 14 | 49/49/2 Q/EA/AM | 28,763 | 2005 | 602 | Flexible | Good | 15.8 |

$^a$P = Copolyester containing 86 mole % isophthalic acid, 10 mole % 5-sodiosulfoisophthalic acid, 4 mole % fumaric acid and diethylene glycol.
Q = Copolyester containing 90 mole % isophthalic acid, 10 mole % 5-sodiosulfoisophthalic acid and diethylene glycol.
EA = ethyl acrylate.
AM = acrylamide.

TABLE 2
Breaking Strength of 100% Polyester Nonwoven Fabric Treated with Grafted Copolyesters

| Example | Binder Composition$^a$ | Add On (%) | Breaking Strength MD* | XD** |
|---|---|---|---|---|
| 15 | 39/59/2 I10(SIP)4(F)DEG/ Ethyl Acrylate/Acrylamide | 9.3 | 21.4$^b$ 15.4$^c$ | 14.2$^b$ 9.6$^c$ |
| 16 | 39/59/2 I10(SIP)4(F)DEG/ Butyl Acrylate/Acrylamide | 8.5 | 20.5 13.7 | 13.7 >10 |
| 17 | 59/39/2 I10(SIP)4(F)DEG/ Ethyl Acrylate/Acrylamide | 8.2 | 20.4 17.3 | 12.9 9.8 |
| 18 | 59/39/2 I10(SIP)4(F)DEG/ Butyl Acrylate/Acrylamide | 8.2 | 19.6 17.8 | 14.5 9.1 |
| Control | — | — | 12.2 5.1 | 7.7 >2.0 |

I = isophthalic acid.
SIP = 5-sodiosulfoisophthalic acid.
F = fumaric acid.
DEG = diethylene glycol.
$^a$2% Cymel 300 (ows) added to binder; samples were cured 90 sec. at 170° C.
$^b$before laundering
$^c$after 5 launderings
*MD = machine direction
**XD = crosswise direction

TABLE 3
Snagging Tendency of a Polyester Knit Treated With Grafted Copolyesters

| Example | Polymer Composition | Add On % (owf)* | Mace Snag Rating |
|---|---|---|---|
| 19 | 59/39/2 I10(SIP)4(F)DEG/ Ethyl Acrylate/Acrylamide | 2.7 | 4.0$^a$ 4.5–5.0$^b$ |
| 20 | 59/39/2 I10(SIP)4(F)DEG/ Butyl Acrylate/Acrylamide | 2.6 | 4.0–4.5 4.5–5.0 |
| 21 | 39/59/2 I10(SIP)4(F)DEG/ Ethyl Acrylate/Acrylamide | 2.7 | 4.0–4.5 4.5–5.0 |
| 22 | 39/59/2 I10(SIP)4(F)DEG/ Butyl Acrylate/Acrylamide | 2.7 | 3.0–4.0 4.0–4.5 |
| Control | — | — | 2.0–3.0 3.0–3.5 |

I = isophthalic acid.
SIP = 5-sodiosulfoisophthalic acid.
F = fumaric acid.
DEG = diethylene glycol.
$^a$before laundering
$^b$after 5 launderings
*based on weight of fabric Although the invention has been described in considerable detail with particular reference to certain preferred embodiments thereof, variations and modifications can be effected within the spirit and scope of the invention.

I claim:
1. A composition comprising:
I. the graft copolymer of Components A, B and C as follows
A. a water-dispersible polyester derived essentially from
(1) at least one dicarboxylic acid:
(2) at least one diol, at least 20 mole percent of said diol component being a poly(ethylene glycol) having the formula

$$H\text{+}(OCH_2CH_2\text{+})_n OH$$

wherein $n$ is an integer of from 2 to about 10, (3) at least one difunctional dicarboxylic acid sulfo-monomer containing a —SO$_3$M group attached to an aromatic nucleus, wherein M is hydrogen or Na$^+$, Li$^+$, K$^+$ or a combination thereof, said sulfo-monomer component constituting at least about 8 mole percent to about 45 mole percent of the sum of the moles of said Components 1, 3 and 4, and
(4) from about 4 to about 8 mole percent of the sum of the moles of said Components 1, 3 and 4 of an α,β-unsaturated dicarboxylic acid selected from the group consisting of fumaric acid, maleic acid, itaconic acid and p-carboxycinnamic acid; said polymer having an inherent viscosity in the range of from about 0.15 to about 0.5 as measured at 25° C. and a concentration of about 0.5 gram of said polyester per 100 ml. of a solvent composed of 60% phenol and 40% tetrachloroethane;
B. from 10 to 80 weight percent based on the total weight of Components A, B and C of an acrylic monomer having the formula $$\begin{array}{c} R \\ | \\ CH_2\!=\!C\!-\!COOR^1 \end{array}$$

wherein R is hydrogen, methyl or ethyl and R$^1$ is an alkyl radical having from 1 to about 8 carbon atoms, vinyl acetate or styrene; and
C. from 2 to 10 weight percent based on the weight of Components A, B and C of a reactive monomer selected from acrylamide, methacrylamide, hydroxyethyl acrylate, hydroxypropyl acrylate, hydroxyethyl methacrylate and hydroxypropyl methacrylate; and II. from 1 to 10 weight percent based on the weight of Components A, B and C of a crosslinking agent selected from melamine-formaldehyde condensates, methylated melamine-formaldehyde condensates, urea-formaldehyde condensates, methylated urea-formaldehyde condensates, guanamine-formaldehyde condensates and methylated guanamine-formaldehyde condensates.

2. The composition of claim 1 comprising:
I. the graft copolymer of Components A, B, C, and D as follows
  A. a water dispersible polyester derived essentially from
    (1) at least 80 mole percent isophthalic acid;
    (2) at least one diol at least 20 mole percent of said diol component being diethylene glycol;
    (3) at least about 8 to about 30 mole percent based on the sum of the moles of said components 1, 3 and 4, of 5-sodiosulfoisophthalic acid; and
    (4) an $\alpha,\beta$-unsaturated dicarboxylic acid selected from fumaric acid and p-carboxycinnamic acid;
  B. an acrylic monomer having the formula

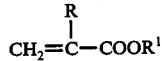

wherein R is hydrogen or methyl and $R^1$ is methyl or ethyl;
  C. a reactive monomer selected from acrylamide and methacrylamide; and
  D. a crosslinking agent selected from melamine-formaldehyde condensates and methylated melamine-formaldehyde condensates.

* * * * *